(12) United States Patent
Song et al.

(10) Patent No.: US 10,394,862 B2
(45) Date of Patent: Aug. 27, 2019

(54) METHOD AND SYSTEM FOR SEMANTICALLY QUERYING A DATABASE BY A MACHINE-TO-MACHINE APPLICATION

(71) Applicant: NEC EUROPE LTD., Heidelberg (DE)

(72) Inventors: JaeSeung Song, Seongnam-si (KR); Joerg Swetina, Schriesheim (DE); Tobias Jacobs, Mannheim (DE)

(73) Assignee: NEC CORPORATION, Tokyo (JP)

( * ) Notice: Subject to any disclaimer, the term of this patent is extended or adjusted under 35 U.S.C. 154(b) by 633 days.

(21) Appl. No.: 14/767,596

(22) PCT Filed: Feb. 18, 2014

(86) PCT No.: PCT/EP2014/053116
§ 371 (c)(1),
(2) Date: Aug. 13, 2015

(87) PCT Pub. No.: WO2014/125120
PCT Pub. Date: Aug. 21, 2014

(65) Prior Publication Data
US 2016/0004767 A1 Jan. 7, 2016

(30) Foreign Application Priority Data

Feb. 18, 2013 (EP) .................................. 13155638

(51) Int. Cl.
*G06F 16/00* (2019.01)
*G06F 16/33* (2019.01)
(Continued)

(52) U.S. Cl.
CPC ............ *G06F 16/334* (2019.01); *G06F 16/95* (2019.01); *G06F 16/951* (2019.01)

(58) Field of Classification Search
CPC ..................... G06F 17/30675; G06F 16/334
(Continued)

(56) References Cited

U.S. PATENT DOCUMENTS 7,818,352 B2 * 10/2010 Krishnamoorthy ..........................
G06F 16/24534
707/803
2007/0276815 A1 * 11/2007 Naibo ................... G06F 16/951
(Continued)

FOREIGN PATENT DOCUMENTS

WO WO 2010071244 A1 6/2010

OTHER PUBLICATIONS

Murugan K et al: "Human Language Query Processing in Temporal Database using Semantic Grammar", Advances in Engineering, Science and Management (ICAESM), 2012 Inetnational Conference on, IEEE, Mar. 30, 2012 (Mar. 30, 2012), pp. 43-47, XP032185179, the whole document.

*Primary Examiner* — Chelcie L Daye
(74) *Attorney, Agent, or Firm* — Leydig, Voit & Mayer, Ltd.

(57) ABSTRACT

A method semantically queries a database by a machine-to-machine application. The database comprises hierarchically structured resources, and semantic information is annotated to at least one resource. The method includes issuing a semantic query for the database. A semantic engine analyzes the semantic query. The semantic engine translates the analyzed semantic query into one or more queries satisfying a communication protocol of the hierarchical resource structure of the database. The translated queries are provided to the database as a query result.

14 Claims, 5 Drawing Sheets

(51) Int. Cl.
*G06F 16/951* (2019.01)
*G06F 16/95* (2019.01)

(58) Field of Classification Search
USPC .............................. 707/769, 760, 722, 754
See application file for complete search history.

(56) References Cited

U.S. PATENT DOCUMENTS

2011/0238683 A1* 9/2011 Kim .................... G06F 16/2452
707/760
2013/0318070 A1* 11/2013 Wu ....................... G06F 16/284
707/722
2013/0332473 A1* 12/2013 Ryman .............. G06F 16/24547
707/754

* cited by examiner

METHOD AND SYSTEM FOR SEMANTICALLY QUERYING A DATABASE BY A MACHINE-TO-MACHINE APPLICATION

CROSS-REFERENCE TO PRIOR APPLICATIONS

This application is a U.S. National Phase application under 35 U.S.C. § 371 of International Application No. PCT/EP2014/053116, filed on Feb. 18, 2014, claiming priority to European Patent Application No. EP 13155638.3, filed on Feb. 18, 2013. The International Application was published in English on Aug. 21, 2014 as WO 2014/125120 under PCT Article 21(2).

FIELD

The present invention relates to a method for semantically querying a database by a machine-to-machine application.

BACKGROUND

Machine-to-machine applications are gaining more and more importance nowadays leading to standards like ETSI M2M, one M2M or the like. Conventional machine-to-machine systems such as specified by ETSI M2M provide well defined machine-to-machine resources to represent things of the real world in electronic form. To provide consistent data translation and data interoperability to heterogeneous machine-to-machine applications semantic annotation of machine-to-machine resources can be used for adding semantic information to machine-to-machine. Such semantically annotated machine-to-machine resources can be contacted by a machine-to-machine application. The machine-to-machine application understands what data is provided by the machine-to-machine resources and the meaning of this data.

Since machine-to-machine resources conventionally comprise sensor devices monitoring and reporting a specific data and actuators executing a given command a semantic machine-to-machine system needs to provide semantic information for both data and commands. Other semantic systems which enable semantic communication store semantic information in a so-called triplestore based database. However, conventional machine-to-machine systems do not use triplestore based databases and as a consequence cannot use for example SPARQL semantic queries and provide semantic information.

To annotate semantic information in a conventional machine-to-machine system the semantic information can be embedded into the ETSI M2M resource format. Another option is to convert the entire ETSI M2M system to a new system using triplestore. However, although all semantic technologies like RDF, OWL, SPARQL, etc. can then be used, this is not feasible because it builds a totally new system and causes other problems, for example, compatibility with legacy ETSI machine-to-machine systems is not ensured.

Semantic information can be annotated into the resource format of an already existing ETSI machine-to-machine system with minimal updates. However only SPARQL commands can be used for the semantic search. In other cases for example semantic information is annotated using another format like the Resource Description Framework RDF, since the Resource Description Framework enables in a general, flexible way to decompose any knowledge into discrete pieces and RDF can be stored in different formats. Since RDF is useful to encode information about relation between things including a lot of semantic information, usually a triplestore-based database is selected in order to store and retrieve such relational information. However, this has the significant drawback, that semantic queries such as SPARQL cannot be used because the machine-to-machine system does not have any semantic information and is not able to understand semantic meaning contained in a semantic query.

SUMMARY

In an embodiment, the present invention provides a method for semantically querying a database by a machine-to-machine application. The database comprises hierarchically structured resources, and semantic information is annotated to at least one resource. The method includes issuing a semantic query for the database. A semantic engine analyses the semantic query. The semantic engine translates the analysed semantic query into one or more queries satisfying a communication protocol of the hierarchical resource structure of the database. The translated queries are provided to the database as a query result.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
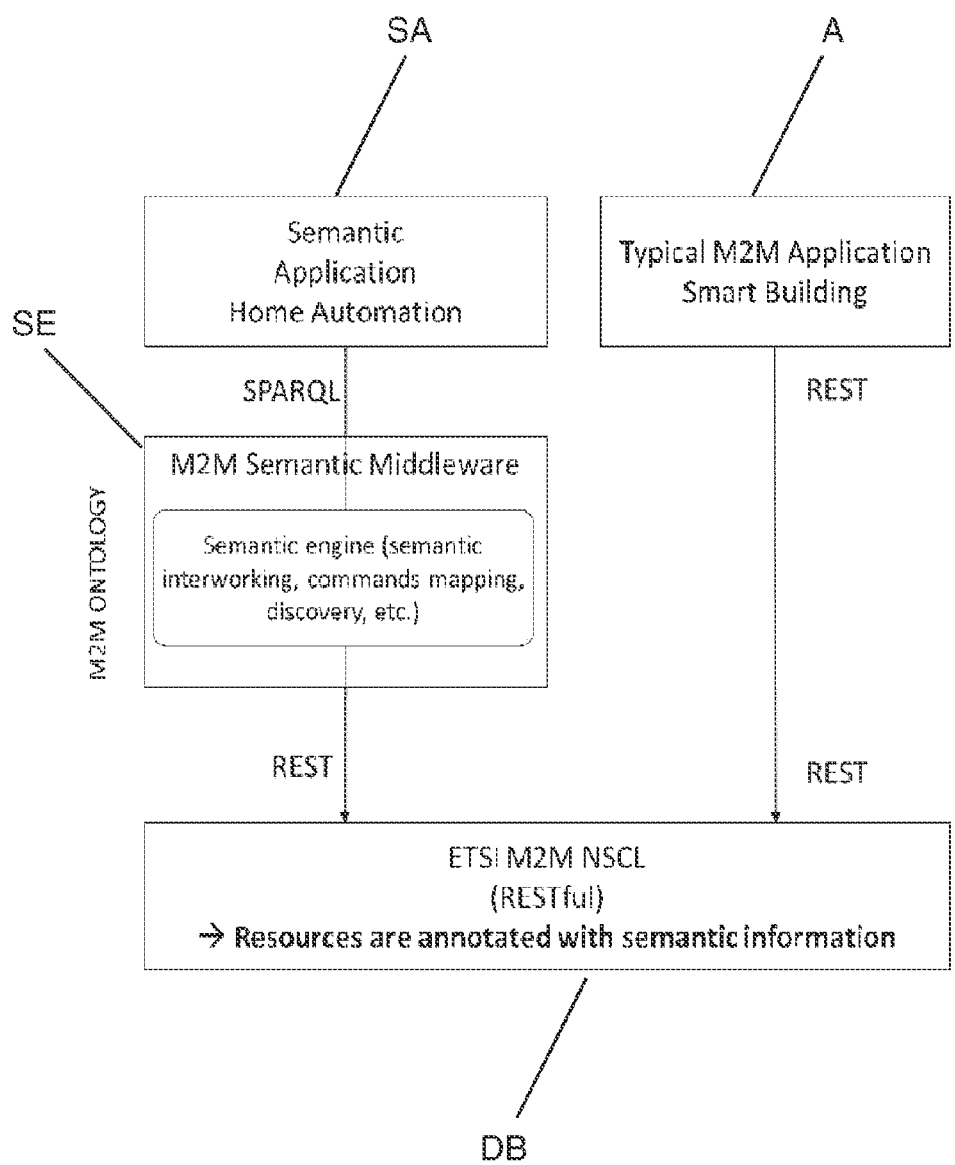
FIG. 1 shows schematically a method according to a first embodiment of the present invention.

The present invention further relates to a system for semantically querying a database by a machine-to-machine application.

Even further, the present invention relates to a database for providing resources for a machine-to-machine application.

It is therefore an objective of the present invention to provide a method and a system for semantically querying a database supporting semantic annotation without using triplestore and enabling semantic interworking, preferably enabling the use of SPARQL to machine-to-machine resources that are not stored in a triplestore database.

According to an embodiment of the present invention, a method for semantically querying a database by a machine-to-machine application is characterized in that the database comprises hierarchically structured resources, wherein semantic information is annotated to at least one resource, and wherein the following steps are performed for querying the database:
 a) Issuing a semantic query for the database,
 b) Analysing the semantic query by a semantic engine,
 c) Translating the analysed semantic query by the semantic engine into one or more queries satisfying a communication protocol of the hierarchical resource structure of the database and
 d) Providing the translated one or more queries to the database for providing a query result.

According to an embodiment of the present invention, a system for semantically querying a database by a machine-to-machine application is characterized in that
 the database comprises hierarchically structured resources, wherein semantic information is added to at least one resource, and wherein the machine-to-machine application is operable to
  issue a semantic query for the database and wherein
  a semantic engine is operable analyse the semantic query and to translate the analysed semantic query into one or more queries satisfying a communication protocols of the hierarchical resource structure of the database and to provide the translated one or more queries to the database.

According to an embodiment of the present invention, a database for providing resources for a machine-to-machine application is characterized in that the database comprises hierarchically structured resources and that at least one of the resources is annotated with semantic information, wherein the semantic information comprises at least resource relative information and link information, and preferably additionally namespace information.

According to an embodiment of the present invention, it has been recognized that semantic information can be annotated into a hierarchical resource structure format and based on semantic rules, a semantic engine can perform semantic search finding member resources matching a given semantic information.

According to an embodiment of the present invention, it has been further recognized that legacy machine-to-machine systems can be provided with semantic functions like handling a semantic query, understanding semantic information, etc.

According to an embodiment of the present invention, it has been further recognized that the semantic engine enables mapping, in particular to treat an ETSI M2M resource as a semantic RDF resource.

According to an embodiment of the present invention, it has been even further recognized that the semantic engine enables a mapping between SPARQL, i.e. a semantic query and RESTful commands of a hierarchically structured database.

Communication protocol is to be understood in its broadest sense, i.e. meaning a protocol to be used for communication with the database, e.g. communicating, querying, etc. the database.

According to a preferred embodiment of the present invention, step c) is performed by extracting the semantic information of the semantic query and embedding the extracted semantic information as payload in a query satisfying the communication protocols of the database. This enables for example to embed semantic information in RESTful queries in a simple way. In this case the receiving database should be enhanced to support semantic search, wherein semantic search is a capability to look at the embedded semantic information resource directly.

According to a further preferred embodiment of the present invention, the further step e) of returning by the database one or more resources matching the translated queries to the semantic engine, wherein the semantic engine checks matching of returned resources with the semantic information of the semantic query, is performed. This enables to provide in a very reliable way resources matching the queries which are checked by the semantic engine.

According to a further preferred embodiment of the present invention, the database itself explores resources and returns identifications of the resources matching the semantic information in the payload to the semantic engine, wherein the semantic engine returns the received results in a semantic response to the machine-to-machine application. This reduces the communication between the machine-to-machine semantic engine and the corresponding database since the database itself can determine resources and identify resources matching the semantic information.

According to a further preferred embodiment of the present invention, the semantic engine performs the mapping between SPARQL and REST and vice versa, when the database is REST-based and the application performs semantic querying based on SPARQL-language, preferably wherein for removing a resource the delete command of REST is mapped onto the update command of SPARQL and vice versa. Mapping between SPARQL and REST enables—since ETSI M2M follows a RESTful approach and interface primitives are designed based on CRUD, i.e. create, retrieve, update and delete operations, whereas SPARQL provides select, construct and modify—compatibility and interoperability between these two languages. Therefore, in particular the RESTful command of create is mapped onto the SPARQL command construct, the retrieve command of REST is mapped onto the select command of SPARQL, the update command of REST is mapped onto the modified command and SPARQL and the delete command of REST is mapped onto the update command of SPARQL and vice versa. Therefore SPARQL can be used to search all machine-to-machine applications and thus the semantic engine maps semantic information and commands into domain specific information and commands and vice versa, therefore enhancing flexibility.

According to a further preferred embodiment of the present invention, semantic information is added as a property or an attribute to at least one resource. Therefore, semantic information can be easily added into an <application> resource in an ETSI M2M system taking into account the hierarchical tree structure of an <application> resource.

According to a further preferred embodiment of the present invention, the semantic information represents relations to and/or between machine-to-machine resources. This enables that the discovery of machine-to-machine resources can be performed by using SPARQL and/or ETSI machine-to-machine RESTful commands further enhancing flexibility and communicationibility of the database.

According to a further preferred embodiment of the present invention, the semantic information comprises the semantic type or the name of a machine-to-machine thing. This enables in an easy way to show the meaning of the thing represented by the resource.

According to a further preferred embodiment of the present invention, the semantic type comprises name conflict resolution information, preferably in form of a namespace prefix. This allows in an easy way to avoid name conflicts. For example the semantic type may be expressed with namespace prefix.

According to a further preferred embodiment of the present invention, the semantic information is provided in a pair format, preferably comprising relation information and link information. This allows in an easy way to describe relationships with other resources or things. For example a Zigbee temperature sensor that is controlled by a Zigbee controller can be described then in the following format: "m2m:isControlled—Zigbee-Controller 1" the semantic information implemented for example as a resource or attribute may be a subject for a resource discovery so that any machine-to-machine application can easily discover ETSI M2M resources without any domain specific expert knowledge.

According to a further preferred embodiment of the present invention, link information comprises one or more universal resource identifications pointing to one or more other resources, preferably wherein the link information is provided as a member attribute to the semantic information or a separate resource. This enhances the flexibility since it can be added as an attribute to the semantic information or it can be provided as a separate resource for example as part of a sub-resource of an <application> resource. In this case the link information enabling a reliable identification either as an absolute or relative universal resource identification the corresponding sub-resource contains a list of namespace universal resource identifications: For example <m2m=http://www.m2m-semantic.org/sensor#>,
<ssn = http://www.homeautomation.org/sensor#>.

According to a further preferred embodiment of the present invention, the semantic information of a machine-to-machine application is added to a search string. This allows in a fast and efficient way to search for resources and the semantic information can be used as keys for discovering resources.

According to a further preferred embodiment of the present invention, namespace information is annotated to at least one of the resources. This enhances the flexibility since new vocabularies can be taken into account upon semantically querying the database.

FIG. 1 shows schematically a method according to a first embodiment of the present invention.

In FIG. 1, an example for a SPARQL query in a semantic machine-to-machine system is shown. The machine-to-machine system comprises a logical building block, i.e. a semantic engine SE. The semantic engine SE enables various semantic functions such as semantic discovery, mapping semantic information to an ETSI machine-to-machine specific information, etc. With this—in other words called semantic middleware comprising the semantic engine SE-legacy machine-to-machine systems can provide semantic functions like handling semantic queries, understanding semantic information, etc.

For example, when a semantic application SA, like a home automation application or the like, issues a SPARQL query then the semantic engine SE "translates" or maps the corresponding SPARQL query into a RESTful query for communicationing an ETSI machine-to-machine database DB. The resources of the database DB are annotated with semantic information. Therefore the semantic engine SE provides for resource discovery a unified communication point of a SPARQL query.

The semantic engine SE can decompose a semantic query into multiple sub-queries, send the queries to relevant resources specific to a particular ontology, combine the sub-query results and finally provide an integrated query result formatted in a common domain ontology. Ontology refers in particular to a formal description of machine-to-machine resources, of structures of resources, properties, processes and their relationships in a corresponding domain, therefore comprising namespace information and a description. The semantic engine SE supports a mapping that enables to treat an ETSI M2M resource as a semantic RDF resource. The semantic engine SE comprises rules which enable the mapping of ETSI M2M resources to resources of a common ontology. The semantic engine SE also provides an interworking function mapping between SPARQL and RESTful commands of an ETSI M2M database DB.

A typical machine-to-machine application A, like smart building, does not use the semantic engine SE since it can directly communicate with the database DB by using RESTful commands. The semantic information added to the resources is ignored in this case.

To provide the resources with semantic information, the semantic information is annotated to the management resources of the semantic machine-to-machine system.

Figure 2:
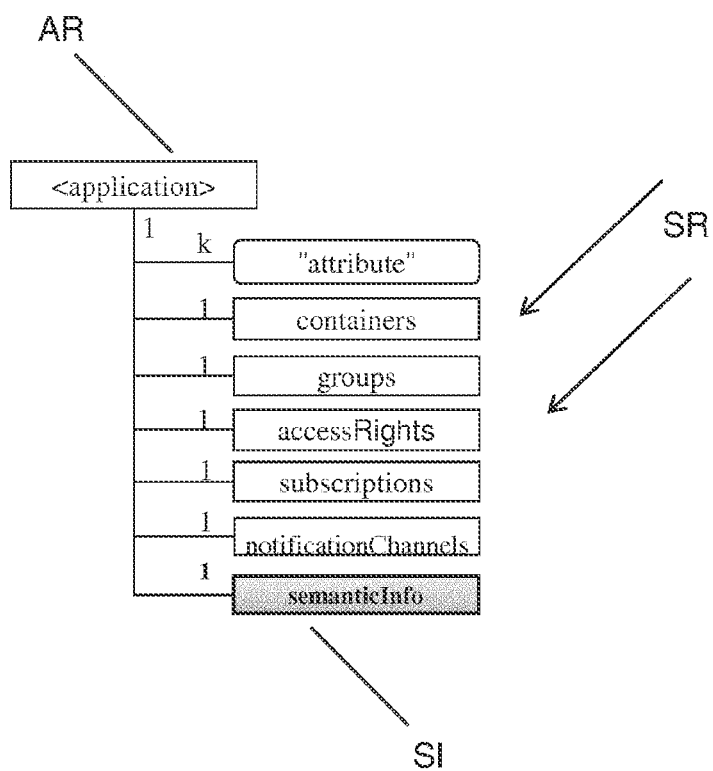
FIG. 2 shows a structure of a resource of a database according to a second embodiment of the present invention.

In FIG. 2, an example for a resource annotated with semantic information is shown:

FIG. 2 shows a structure of a resource of a database according to a second embodiment of the present invention.

In FIG. 2, the structure of an <application> resource AR annotated with semantic information is shown.

Semantic information is retrieved from relations between machine-to-machine resources and can be annotated as an attribute or property of the corresponding resource. It depends for example on the data storing mechanism of a target database DB. In an ETSI machine-to-machine system the databases used are hierarchical tree structured to store and represent resources. Thus, in the ETSI machine-to-machine system semantic information can be embedded through introducing a new resource called <semanticInfo> SI. This semanticInfo resource preferably comprises all the semantic relationships of a resource with other resources.

In an ETSI machine-to-machine system, a device or a thing is usually represented as an <application> resource AR shown in FIG. 2. The semantic info resource can be added to the application resource and the structure of the application resource annotated with the semantic information may be as follows: The application resource AR comprises several sub-resources SR like "attribute", containers, groups, communication rights, subscriptions, notification channels and further according to the invention a sub-resource semanticInfo SI. The semanticInfo resource SI provides semantic information about relations between resources the same as a triple store does. By using the semantic engine SE the discovery of machine-to-machine resources can be performed both using SPARQL and ETSI machine-to-machine RESTful commands. Since the ETSI machine-to-machine system does not understand SPARQL queries, the semantic engine SE is used converting SPARQL commands into RESTful commands or vice versa.

Figure 3:
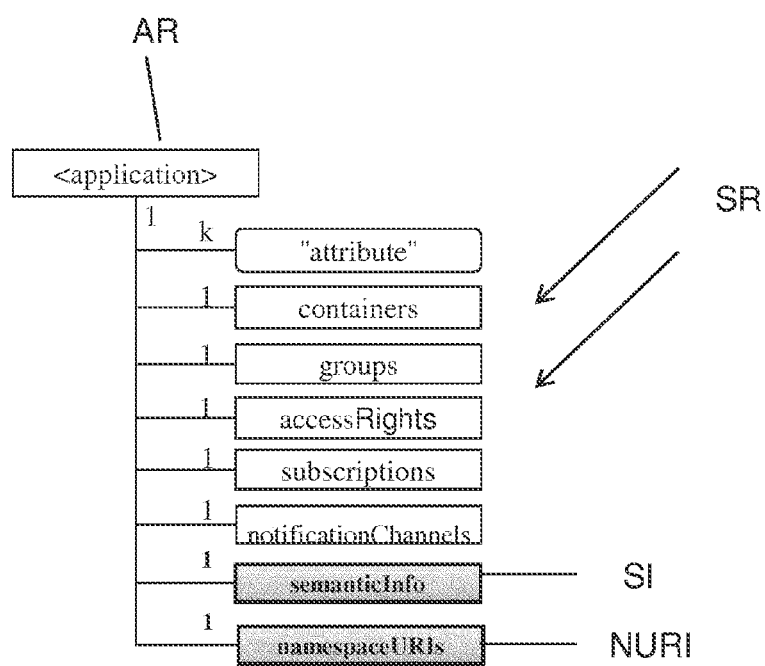
FIG. 3 shows a second embodiment of a resource according to a third embodiment of the present invention.

In more detail, the semanticInfo SI resource may comprise the semantic type or name of the resource. This ontology, i.e. the formal description of machine-to-machine resources and their relations show the meaning of the resource. The semantic type can be expressed with a namespace prefix in order to avoid name conflicts. The name space universal resource identification URI can be for example a member attribute of the semanticInfo SI resource or described as a separate resource at it is shown in FIG. 3.

To describe relationships with other things represented in the machine-to-machine system, the semanticInfo SI resource can for example have pair format, like <relation: link to other resource> As a more specific example a Zigbee temperature sensor that is controlled by a Zigbee controller can be described in the following format: "m2m: isControlled—Zigbee-Controller-1". This semanticInfo SI resource is provided discoverable, i.e. as a subject for resource discovery, so that any machine-to-machine application can easily discover ETSI machine-to-machine resources without any domain specific expert knowledge.

The object of relation in a semantic info SI resource, i.e. "link to other thing" can be any type of resource. All type of things in ETSI machine-to-machine systems like actual things, abstract devices or virtual things can be used as a subject for "link to other thing". This "link to other thing" may comprise an absolute or relative universal resource identification URI pointing to another ETSI machine-to-machine resource. Referring now to the previous example of the Zigbee temperature sensor, the Zigbee controller 1 is the resource representing an actual thing existing in the ETSI machine-to-machine system and virtual things can be used to add more semantic information to the actual things. For example if a sensor is deployed in a room-1, a semantic annotation between the sensor and the room-1 provides semantic information about the location, i.e. room-1 is not a physical object but a virtual thing. By annotating the relationship between the sensor and room-1, a user can discover the sensor when asking or querying sensors in room-1. This relationship can then be described in the pair format: "m2m: is Deployed-room-1".

A new semantic information in the semantic info SI resource can be easily created, updated and deleted through using ETSI machine-to-machine support at RESTful commands like create, update and delete respectively.

As mentioned before, in order to avoid name conflicts between vocabularies used in the semanticInfo SI a resource namespace prefixes and the namespace universal resource identification are also defined. For the above example of the temperature sensor in room-1 the "link to other thing" as defined as "isDeployed-room-1" could be defined differently in two different domains: For example ssn:is Deployed and m2m:isDeployed, where ssn stands for the "semantic sensor network" namespace. Therefore "isDeployed" can be defined within another namespace prefix. If semantic information is provided together with this namespace prefix, a reader could be able to understand that there are different semantic information even though they have the same name. To include a namespace universal resource identification it can be introduced as an attribute of the semanticInfo SI resource or as a separate resource, i.e. as part of a sub-resource of an <application> resource AR. This is shown in FIG. 3.

FIG. 3 shows a second structure of a resource of a database according to a third embodiment of the present invention.

In FIG. 3, an example of namespace universal resource identification as part of a sub-resource of an application resource AR is shown. In this case <namespace URIs> NURI comprises a list of name space universal resource identifications: For example <m2m=http://www.m2m-semantic.org/sensor#>
<ssn=http://www.homeautomation.org/sensor#>

The semantic information, including the semantic information of the semanticInfo SI resource and the name space URIs sub-resource are preferably added to a search string to use as keys for discovering resources in the machine-to-machine system.

Figure 4:
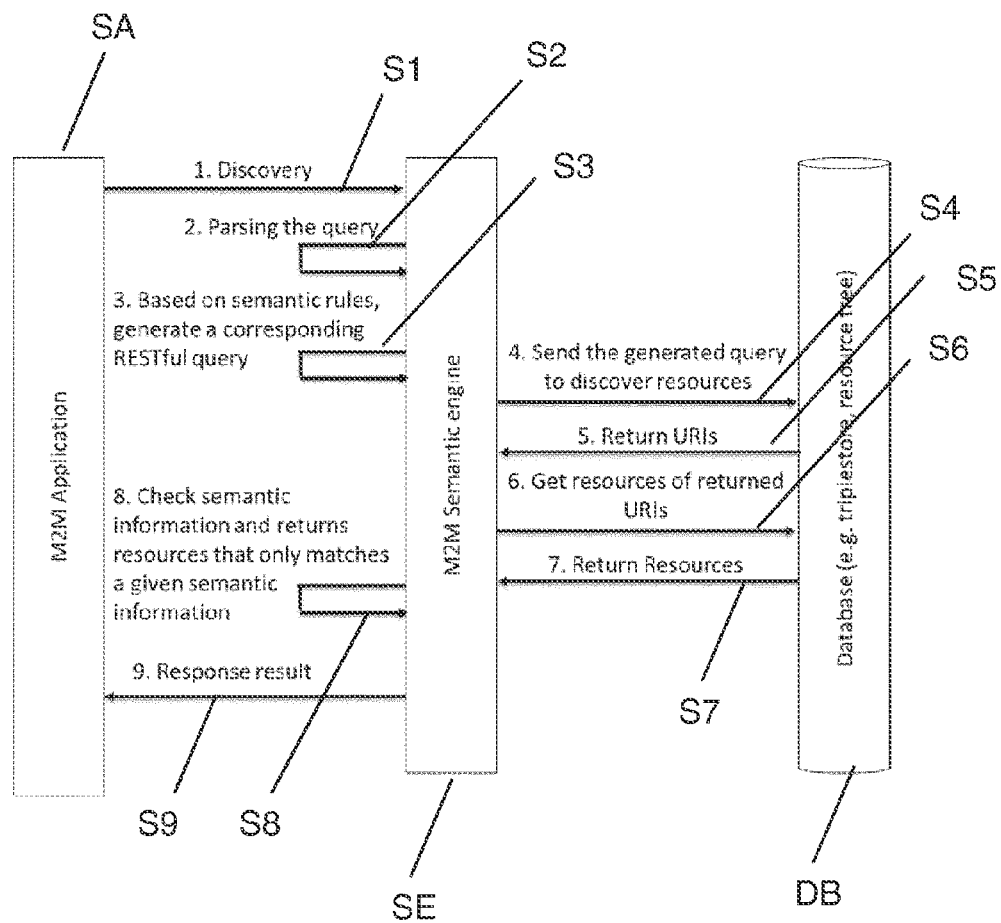
FIG. 4 shows steps of a method according to a fourth embodiment of the present invention.

FIG. 4 shows steps of a method according to a fourth embodiment of the present invention.

In FIG. 4, steps for providing a response result upon a semantic query are shown.

The semantic engine SE provides various function for example resource discovery within the semantic machine-to-machine system. The semantic engine SE provides a unified communication point of a SPARQL query to machine-to-machine applications and provides inter alia the following functionalities
  passing input SPARQL queries,
  mapping SPARQL commands to RESTful commands,
  decomposing a semantic query into multiple sub-queries based on semantic interworking rules and
  searching semantic information from returned machine-to-machine resources for a query.

When a semantic query arrives at the semantic engine SE, the semantic engine SE parses the query. The semantic engine SE has semantic interworking rules so that based on the command or other attached semantic information in the semantic query, the semantic engine SE applies a proper rule and generates a corresponding RESTful query.

In the following steps are shown when a semantic query from a machine-to-machine application is issued.

In a first step S1, the machine-to-machine application SA sends a discovery query to the machine-to-machine semantic engine SE.

In a second step S2, the semantic engine SE parses the query.

In a third step S3, the semantic engine SE generates a corresponding RESTful query based on semantic rules.

In a fourth step S4, the semantic engine SE sends the generated discovery query to a database DB, for example triple store or resource tree based.

In a fifth step S5, the database DB finds the resources matching given search strings in the received query of step S4 and returns the corresponding universal resource identifiers URIs to the semantic engine SE.

In a sixth step S6, the semantic engine SE sends request messages to get the resource of the returned universal resource identifiers URI to the database DB.

In a seventh step S7, the database DB returns the requested resources to the semantic engine SE.

In an eighth step S8, the semantic engine SE checks the returned resources from the database DB whether they match the requested semantic information from the machine-to-machine application SA.

In a ninth step S9, the semantic engine SE returns only the resources that match the semantic information in a SPARQL response message back to the machine-to-machine application SA.

Figure 5:
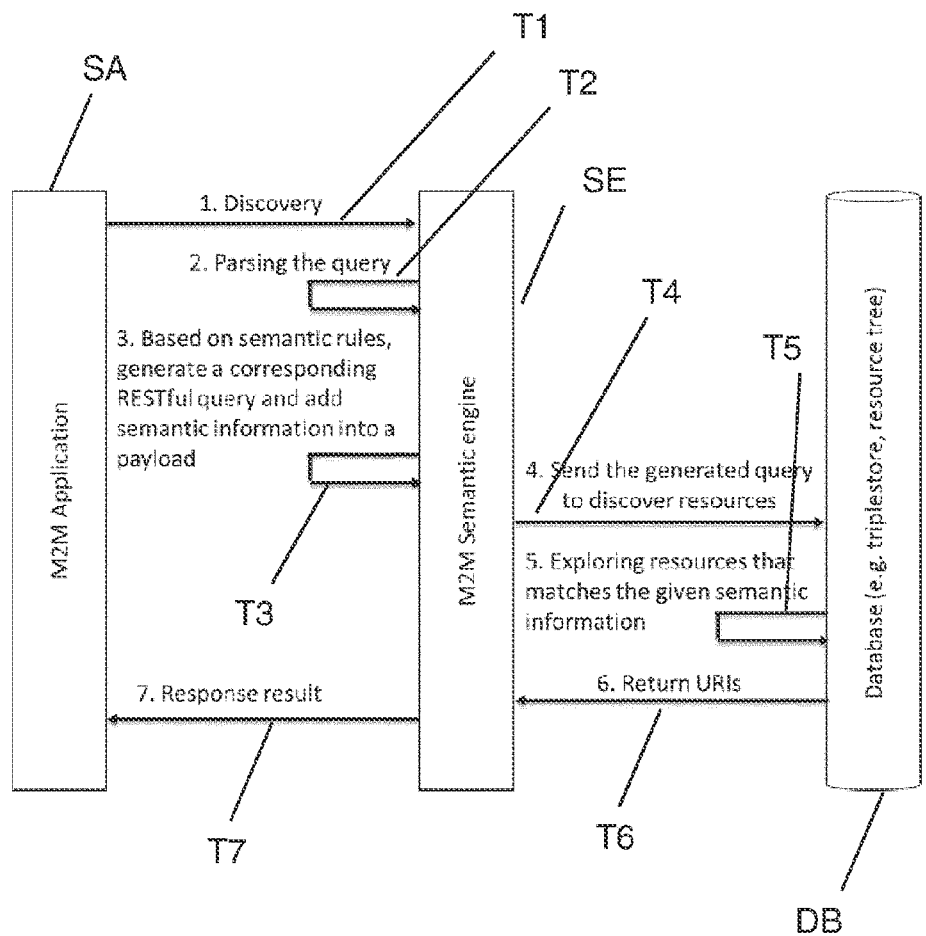
FIG. 5 shows steps of a method according to a fifth embodiment of the present invention.

FIG. 5 shows steps of a method according to a fifth embodiment of the present invention.

In FIG. 5, semantic information is embedded in a RESTful query as a payload. In this case the database DB is required to support semantic search, i.e. having the capability to look at the semanticInfo SI resource directly. In this case the following steps for providing a result upon a SPARQL query are performed:

In a first step T1, the machine-to-machine application SA sends a discovery query to the semantic engine SE.

In a second step T2, the semantic engine SE parses the received query.

In a third step T3, the semantic engine SE generates a corresponding restful query based on the semantic rules and adds semantic information into a payload of the generated query.

In a fourth step T4, the semantic engine SE sends the generated discovery query to discover resources to the database DB.

In a fifth step T5, the database DB enhanced to do semantic search, explores its resource tree and finds resources matching given semantic information extracted from the payload of the received query.

In a sixth step T6, the database DB returns the search results with the list of resource universal resource identifiers URI to the semantic engine SE.

In a seventh step T7, the semantic engine SE returns the results using a SPARQL formatted response to the machine-to-machine application SA.

In general according to an embodiment of the present invention, the SPARQL protocol and RDF query language is a query language for RDF. SPARQL enables its user to retrieve and manipulate RDF formatted data stored in a triple store database and further allows a query such as "retrieve all sensors collecting temperature data" so that its user can find useful information through commonly used technologies using semantic definitions.

ETSI M2M systems are based on REST and interface primitives are designed based on CRUD (create, retrieve, update and delete) operations SPARQL preferably supports corresponding operations. Basically SPARQL language provides select, construct and modify commands which can be mapped to retrieve, create and update operations in ETSI M2M respectively. In case of the delete operated can be implemented using the SPARQL/update command which extends the basic SPARQLE.

In table 1, such an exemplary mapping between ETSI M2M RESTful operations and SPARQL commands for a semantic machine-to-machine system is shown:

| Operation | RESTful command | SPARQL command | Response |
|---|---|---|---|
| Add/Insert resource | CREATE | CONSTRUCT | Status 200 OK |
| Find information | RETRIEVE | SELECT | RDF containing results |
| Update resource | UPDATE | MODIFY | Status 200 OK |
| Remove resource | DELETE | DELETE (SPARQL/Update) | Status 200 OK |

In the following, an example is shown how SPARQL can be used to search all machine-to-machine applications having "temperature" as their type. The query returns then all information of the discovered applications including universal resource identifier, location, etc.

As shown in the example below, all applications that have a specific type can be discovered whether they are for example a Zigbee sensor or a KNX type sensor:

```
PREFIX rdf: < http://www.w3.org/1999/02/22-rdf-syntax-ns#>
PREFIX xsd: <http://www.w3.org/2001/XMLSchema#>
PREFIX m2m: <http://semantic-etsi-m2m.org/example/etsi-m2m-
ontology#>
   SELECT * WHERE {?application m2m:hasType "Temperature".}
```

In summary, the present invention enables annotation of semantic information, in particular relation and link to an object, into a hierarchical resource structure format. The present invention further enables namespaces that can be annotated in a hierarchical structure for the flexibility of new vocabularies. Even further the present invention provides semantic queries such as using SPARQL being passed and handled by a function translating semantic queries into queries that can be handled in an ETSI machine-to-machine based system.

Further, the present invention enables a semantic engine or a hosting database performing semantic search based on semantic rules finding resources matching given semantic information. Even further the present invention enables a semantic engine translating semantic information and commands into for example domain specific information and commands.

The present invention has inter alia the advantage to provide a wrapper for existing systems to enable semantic information based on semantic annotations in an ETSI M2M system.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A processor-implemented method for semantically querying a database by a machine-to-machine application, wherein the database comprises hierarchically structured machine-to-machine resources, and semantic information is annotated to at least one resource, the method comprising:

analysing, by a semantic engine, a semantic query issued for the database;

translating, by the semantic engine, the analysed semantic query into one or more queries satisfying a communication protocol of the hierarchical resource structure of the database; and providing the translated one or more queries to the database as a query result, wherein the semantic information includes a property or an attribute added to the at least one resource and represents relations to or between machine-to-machine resources.

2. The method according to claim 1, wherein translating, by the semantic engine, the analysed semantic query into the one or more queries satisfying the communication protocol of the hierarchical resource structure of the database is performed by extracting the semantic information of the semantic query and embedding the extracted semantic information as payload in a query satisfying the communication protocol of the database.

3. The method according to claim 1, further comprising returning, by the database, one or more resources matching the translated queries to the semantic engine, wherein the semantic engine checks matching of the returned resources with the semantic information of the semantic query.

4. The method according to claim 2, wherein the database explores resources and returns identifications of the resources matching the semantic information in the payload to the semantic engine, wherein the semantic engine returns the received results in a semantic response to the machine-to-machine application.

5. The method according to claim 1, wherein the semantic engine performs a mapping between SPARQL and REST and vice versa, and wherein the database is REST-based and the application performs semantic querying based on SPARQL-language.

6. The method according to claim 1, wherein the semantic information comprises a semantic type or a name of a machine-to-machine thing.

7. The method according to claim 6, wherein the semantic type comprises name conflict resolution information.

8. The method according to claim 1, wherein the semantic information is provided in a pair format.

9. The method according to claim 8, wherein the semantic information includes link information that comprises one or more universal resource identifications pointing to one or more other resources.

10. The method according to claim 1, wherein semantic information of a machine-to-machine application is added to a search string.

11. The method according to claim 1, wherein namespace information is annotated to the at least one resource.

12. A computer system for semantically querying a database by a machine-to-machine application, the system comprising:

the database comprising hierarchically structured machine-to-machine resources, wherein semantic information is added to at least one resource as a property or an attribute to the at least one resource, the semantic information representing relations to or between machine-to-machine resources;

the machine-to-machine application configured to issue a semantic query for the database; and a semantic engine configured to analyse the semantic query, to translate the analysed semantic query into one or more queries satisfying a communication protocol of the hierarchical resource structure of the database and to provide the translated one or more queries to the database as a query result.

13. A database for providing resources for a machine-to-machine application, wherein the database comprises hierarchically structured resources and at least one of the resources is annotated with semantic information, wherein the semantic information comprises at least resource relation information and link information.

14. The database according to claim 13, further comprising namespace information.

* * * * *